N. DRAKE.
Draft-Equalizer.
No. 23,557.
Patented Apr. 12, 1859.
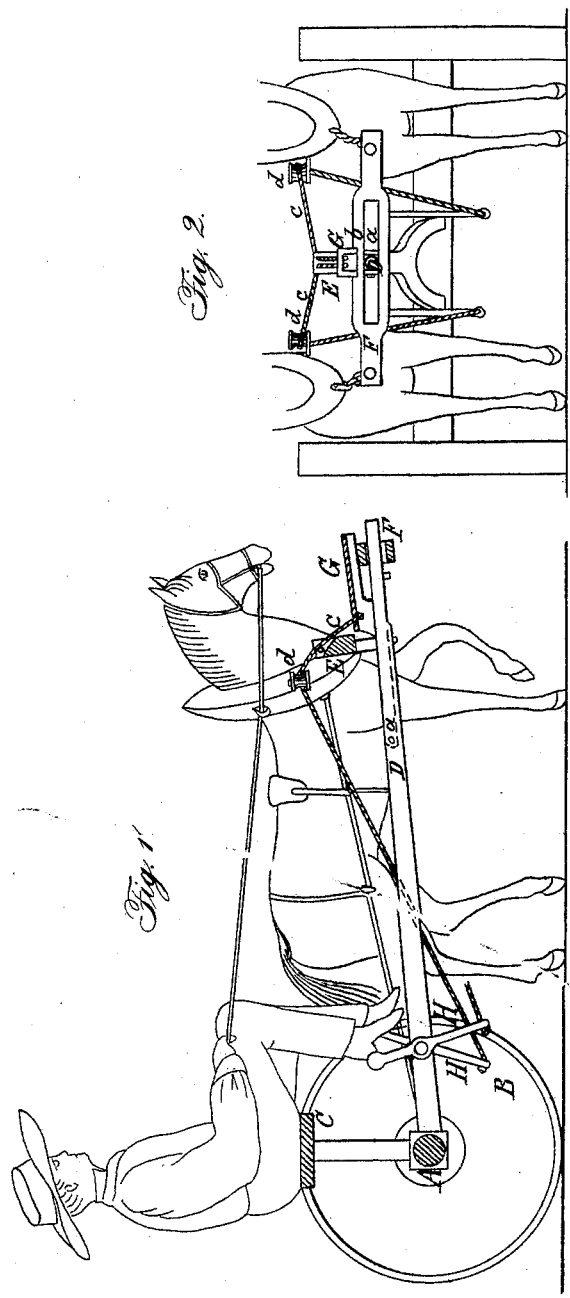
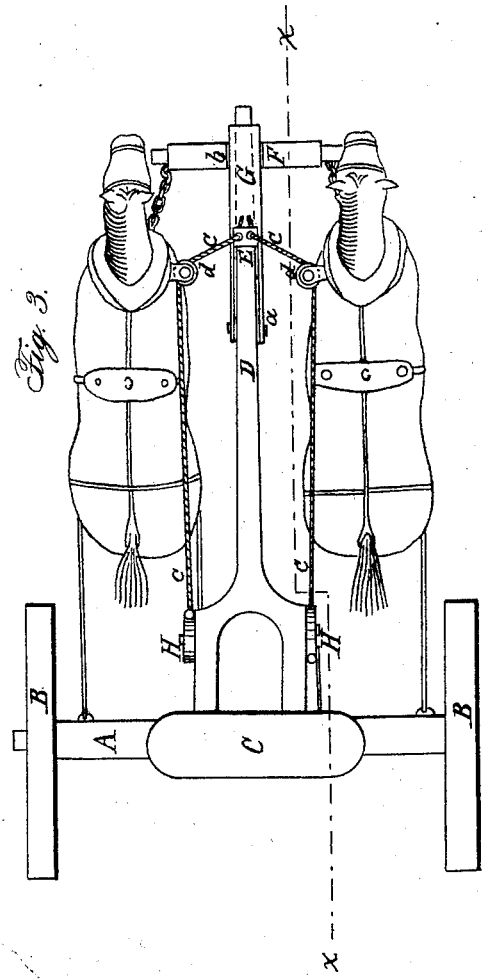
Witnesses:
R. T. Shiner
W. H. Armstrong
Inventor:
N. Drake

UNITED STATES PATENT OFFICE.

NATHANIEL DRAKE, OF NEWTON, NEW JERSEY.

GUIDE ATTACHMENT FOR VEHICLES.

Specification of Letters Patent No. 23,557, dated April 12, 1859.

*To all whom it may concern:*

Be it known that I, NATHANIEL DRAKE, of Newton, in the county of Sussex and State of New Jersey, have invented a new and useful Guide Attachment for Vehicles and Draft Implements; and I do hereby declare that the following is a full, clear, and exact description of the same, reference being had to the annexed drawings, making a part of this specification, in which—

Figure 1 is a side sectional view of my invention taken in the line $x$, $x$, Fig. 3. Fig. 2, is a front view of ditto. Fig. 3, is a plan or top view of ditto.

Similar letters of reference indicate corresponding parts in the several figures.

The object of this invention is to prevent vehicles and draft implements being casually thrown to either side their regular or direct course by any lateral movement of the team, and also to permit vehicles or draft implements to be moved laterally to a certain extent independently of any movement of the team.

The invention is more especially designed to be applied to agricultural implements, such as seeding machines, cultivators, and the like, where it is essential in certain cases that the implement be drawn in as direct a line as possible, and also where in certain cases it is essential that a short or quick deviation from a direct course be made.

The invention places the implement or vehicle, so far as a draft is concerned under the complete control of the driver, and it consists in having the front end of the draft pole connected to the strap bar by a catch which is connected by cords to levers placed within reach of the driver's feet, the whole being so arranged to effect the desired result as hereinafter fully shown and described.

To enable those skilled in the art to fully understand and construct my invention I will proceed to describe it.

A, represents an axle and B, B, the wheels of a vehicle or a draft implement. C, the driver's seat, D, the draft pole attached to the axle either directly or by means of "hounds." Near to the front end of the draft pole D, a short upright bar E, is attached, and F, is the pole strap bar which is fitted on the end of the draft pole D, and bears against the upright E.

The pole strap bar F, is slotted longitudinally near its whole length and is prevented from sliding casually thereon by a catch G, which is simply a bar bifurcated at its back part, and pivoted to the pole D, at either side as shown at $a$, the front end of the bar fitting in a recess $b$, in the upper surface of the pole strap bar, see more particularly Fig. 2.

To the bar or catch G, just in front of the upright E, two cords $c$, $c$, are attached. These cords pass up through the upper part of the upright and through sheaves $d$, $d$, attached to the collars of the horses, a cord passing through the sheave of each collar and are attached to levers H, H, which are pivoted to the inner part of the draft pole near the driver's seat, so that said levers may be acted on by the feet of the driver, as shown clearly in Fig. 1.

The horses are connected to the vehicle or implement in the usual way, and it will be seen from the above description that when the catch G is in the recess $b$, of the strap bar F, the draft pole D, will be affected by any lateral movement of the horses or team, because the strap bar is connected to the draft pole. In case however the team make a lateral movement and it is desired that the vehicle be not affected thereby, the driver with his foot actuates one of the levers H, and by so doing raises the catch G, out of the recess $b$, of strap bar F, and the strap bar F, is allowed to slide on the draft pole without affecting it,—any lateral movement of the vehicle therefore may be readily prevented. It will also be seen that in case the vehicle requires to be suddenly moved to the right or left, the driver can effect the object by simply actuating the right or left lever H, according to the direction in which the vehicle is to be turned and the catch G, will be raised as before, and the cord $c$, of said lever by continuing the action on the lever be made to actuate the draft pole or turn it in the desired direction.

Thus it will be seen, that by this invention the vehicle or implement is placed under the perfect control or guidance of the driver, and it will prove highly valuable as an attachment for various agricultural implements used in the cultivation of crops, and the harvesting of the same.

The catch G, falls and engages with the strap bar F, by its own gravity, when the levers H, are released from the feet of the driver.

Having thus described my invention what I claim as new and desire to secure by Letters Patent, is,

The slotted pole-strap bar F, and catch G, placed on and connected with the draft pole D, respectively as shown, in connection with the cords c, c, attached to the catch G, passing through the uprights E, and sheaves d, d, of the horse collars and attached to foot levers H, H, or their equivalents substantially as and for the purpose set forth.

N. DRAKE.

Witnesses:
R. T. SHINER,
W. A. ARMSTRONG.